United States Patent
Isom et al.

(10) Patent No.: US 9,923,221 B2
(45) Date of Patent: Mar. 20, 2018

(54) METHOD OF DECONTAMINATING A FUEL REACTANT STREAM FOR A FUEL CELL

(71) Applicant: DOOSAN FUEL CELL AMERICA, INC., South Windsor, CT (US)

(72) Inventors: Joshua D. Isom, South Windsor, CT (US); Leslie L. VanDine, Manchester, CT (US); Derek W. Hildreth, Manchester, DE (US); John L. Preston, Hebron, CT (US); Paul R. Hanrahan, Farmington, CT (US); Lynn Hamilton, Vernon, CT (US)

(73) Assignee: DOOSAN FUEL CELL AMREICA, INC., South Windsor, CT (US)

( * ) Notice: Subject to any disclaimer, the term of this patent is extended or adjusted under 35 U.S.C. 154(b) by 0 days.

(21) Appl. No.: 15/378,642

(22) Filed: Dec. 14, 2016

(65) Prior Publication Data
US 2017/0133698 A1  May 11, 2017

Related U.S. Application Data

(62) Division of application No. 13/263,148, filed as application No. PCT/US2009/002566 on Apr. 27, 2009, now Pat. No. 9,553,323.

(51) Int. Cl.
*H01M 8/06* (2016.01)
*H01M 8/0662* (2016.01)
(Continued)

(52) U.S. Cl.
CPC ...... *H01M 8/0687* (2013.01); *B01D 53/1412* (2013.01); *B01D 53/1425* (2013.01); *H01M 8/04014* (2013.01); *H01M 8/04708* (2013.01)

(58) Field of Classification Search
CPC ............. B01D 53/1412; B01D 53/1425; B01D 53/18; B01D 2257/406; C01B 3/32;
(Continued)

(56) References Cited

U.S. PATENT DOCUMENTS 6,376,114 B1  4/2002  Bonville et al.
6,979,505 B2  12/2005  Grasso et al.
(Continued)

OTHER PUBLICATIONS

International Search Report for PCT Application No. PCT/US/2009-002566, dated Feb. 17, 2010.

*Primary Examiner* — Gary Harris
(74) *Attorney, Agent, or Firm* — Carlson, Gaskey & Olds, P.C.

(57) ABSTRACT

An example method of decontaminating a fuel reactant stream for a fuel cell flows the fuel reactant stream through a fluidized ammonia dissolving media, while simultaneously flowing water through the fluidized ammonia dissolving media to separate contaminants from the fuel reactant stream into a separated contaminant and water stream. The separated contaminant and water stream from the fluidized bed is accumulated within an accumulator, circulated through a water-control loop, and decontaminated by flowing the stream through an ion exchange bed secured in fluid communication with the water-control loop. A decontaminated water stream from the ion exchange bed is circulated back through the ammonia dissolving media. A temperature of the fuel reactant stream is controlled upstream of the fuel reactant stream entering the separator scrubber to produce a predetermined temperature of the fuel reactant stream passing through the separator scrubber.

12 Claims, 2 Drawing Sheets

(51) Int. Cl.
*B01D 53/14* (2006.01)
*H01M 8/04701* (2016.01)
*H01M 8/04014* (2016.01)

(58) Field of Classification Search
CPC ...... C01B 2203/0283; C01B 2203/066; C01B 2203/0205; H01M 8/04014; H01M 8/0662; H01M 8/0618; Y02E 60/50
USPC .......................................................... 429/410
See application file for complete search history.

(56) References Cited

U.S. PATENT DOCUMENTS

2005/0058868 A1   3/2005  Taga
2009/0246573 A1* 10/2009  Grasso .................. B01D 53/58
                                                        429/412

* cited by examiner

METHOD OF DECONTAMINATING A FUEL REACTANT STREAM FOR A FUEL CELL

CROSS-REFERENCE TO RELATED APPLICATION

This application is a divisional of U.S. application Ser. No. 13/263,148, filed on Oct. 6, 2011, which is the National Stage of International Application No. PCT/US2009/002566, filed Apr. 27, 2009 the disclosures of which are incorporated by reference herein in their entirety

TECHNICAL FIELD

The present disclosure relates to fuel cells that are suited for usage in transportation vehicles, portable power plants, or as stationary power plants, and the disclosure especially relates to a contaminant removal system for efficiently removing contaminants such as ammonia and particulates from a fuel reactant stream passing into a fuel cell.

BACKGROUND ART

Fuel cells are well known and are commonly used to produce electrical current from hydrogen containing reducing fluid fuel and oxygen containing oxidant reactant streams to power electrical apparatus such as transportation vehicles. In fuel cells of the prior art, it is well known that fuel is produced by a reformer and the resulting fuel is referred to as a reformate fuel that flows from the reformer through a fuel reactant stream inlet line into an anode flow field of the fuel cell. As is well known an oxygen rich reactant simultaneously flows through a cathode flow field of the fuel cell to produce electricity. Unfortunately, such reformate fuels frequently contain contaminants especially ammonia. The presence of ammonia in the reformate fuel stream is detrimental to the performance of the fuel cell. It is understood that ammonia is a common byproduct of the reforming process and although the reforming process is designed to minimize formation of ammonia, it is common that low levels of ammonia are present in the reformate fuel. In steam reformers, ammonia formation results from nitrogen that is present in natural gas that is fed into the reformer to be reformed into the fuel. Typically nitrogen content is between 2-3 percent but may reach as high as 15 percent in some parts of the world. Known fuel cells that include phosphoric acid as an electrolyte cannot achieve a desired 10 year life with greater than 1-2 percent nitrogen within the natural gas. Additionally, in the case of auto thermal or partial oxidation reformers, nitrogen can also be introduced when air is used as the oxygen source for the reforming process.

Many efforts have been undertaken to remove ammonia and other contaminants from fuel reactant streams of fuel cells. For example, U.S. Pat. No. 4,801,356 that issued on Jan. 31, 1989, to Grasso disclosed an elaborate system for removal of ammonia from fuel cell power plant water. The system of Grasso includes passing cooling water that had been used to cool the reformate fuel through a first steam stripper and a second steam stripper to remove the ammonia contaminant. Although effective, the system of Grasso requires complex and costly strippers and processing of a large volume of fuel cell coolant water.

More recently U.S. Pat. No. 6,376,114, that issued on Apr. 23, 2002 to Bonville, Jr. et al., disclosed another elaborate system for removing ammonia and other contaminants from reformate fuel. The system of Bonville, Jr. et al., includes alternatively a disposable ammonia scrubber, an ammonia scrubbing cool water bed and an ammonia stripping warm water bed, a pair of first and second regenerable scrubbers, or a single regenerable scrubber. Again, while effective the Bonville, Jr. et al system includes elaborate and costly components that require a high level of maintenance to operate the system. Other ammonia and related contaminant removal systems for fuel cells are known in the art. However, none of these provide for efficiently removing ammonia with minimal costs and minimal maintenance requirements. Most known ammonia contaminant removal systems require large components for processing a high volume of fluids, or require high frequency removal and replacement of contaminated filters and/or ion beds, etc.

Consequently, there is a need for a contaminant removal system for a fuel reactant stream that may be operated efficiently for a long period of time without high frequency maintenance.

SUMMARY

One example embodiment of a method of decontaminating a fuel reactant stream for a fuel cell includes flowing the fuel reactant stream through a fluidized ammonia dissolving media within a fluidized bed that dissolves ammonia and removes particulates from the fuel reactant stream within a separator scrubber, while simultaneously flowing water through the fluidized ammonia dissolving media within the fluidized bed to separate contaminants from the fuel reactant stream into a separated contaminant and water stream. The separated contaminant and water stream from the fluidized bed is accumulated within an accumulator. The separated contaminant and water stream from the accumulator is circulated through a water-control loop. The separated contaminant and water stream is decontaminated by flowing the stream through an ion exchange bed secured in fluid communication with the water-control loop. A decontaminated water stream from the ion exchange bed is circulated back through the ammonia dissolving media. A temperature of the fuel reactant stream is controlled upstream of the fuel reactant stream entering the separator scrubber to produce a predetermined temperature of the fuel reactant stream passing through the separator scrubber.

In another example embodiment of the above described method, an ammonia solubility enhancing reagent is added to the ammonia dissolving media within the separator scrubber.

In another example embodiment of any of the above described methods, the ion exchange bed exchange material is replaced at predetermined time intervals.

In another example embodiment of any of the above described methods, a volume of the ion exchange bed ion exchange material is selected so that the volume of ion exchange material within the bed may be replaced at pre-determine time intervals.

In another example embodiment of any of the above described methods, controlling the temperature of the fuel reactant stream upstream of the fuel reactant stream entering the separator scrubber comprises controlling the temperature of the fuel reactant stream upstream of booth the separator scrubber and the water-control loop.

In another example embodiment of any of the above described methods, the method includes sensing information from the fuel reactant stream, and the controlling of a temperature of the fuel reactant stream upstream of the fuel reactant stream entering the separator scrubber is performed based on the sensed information.

In another example embodiment of any of the above described methods, the sensed information includes at least one of a temperature of the fuel reactant stream, a moisture content of the fuel reactant stream, and a water level of the fuel reactant stream.

In another example embodiment of any of the above described methods, controlling a temperature of the fuel reactant stream upstream of the fuel reactant stream entering the separator scrubber comprises cooling the fuel reactant stream with a first heat exchanger upstream of the separator scrubber, and the method includes heating the fuel reactant stream with a different, second heat exchanger downstream of the separator scrubber.

In another example embodiment of any of the above described methods, the method includes pumping coolant through a coolant loop conduit from a coolant plate secured adjacent to the fuel cell, through a coolant heat exchanger configured to remove heat from the coolant, and back to the coolant plate; and the heating of the fuel reactant stream with a different, second heat exchanger downstream of the separator scrubber comprises directing a flow of coolant from the coolant loop conduit to be in heat exchange relationship with the fuel reactant stream downstream of the separator scrubber.

In another example embodiment of any of the above described methods, excess water is selectively discharged out of the water-control loop through a water discharge valve that is in fluid communication with the water-control loop.

In another example embodiment of any of the above described methods, the ion exchange bed includes a cation-only exchange resin.

One example embodiment of a method of decontaminating a fuel reactant stream for a fuel cell includes directing the fuel reactant stream into a fluidized ammonia dissolving media within a fluidized bed, removing contaminants from the fuel reactant stream within a separator scrubber, and directing water through the fluidized ammonia dissolving media to separate contaminants from the fuel reactant stream into a separated contaminant and water stream. The method also includes decontaminating the separated contaminant and water stream using an ion exchange bed, circulating a decontaminated water stream from the ion exchange bed back through the ammonia dissolving media, and controlling a temperature of the fuel reactant stream upstream of the fuel reactant stream entering the separator scrubber to produce a predetermined temperature of the fuel reactant stream entering the separator scrubber.

An example advantage of the methods described above is that the thermal control function is separated from the contaminant removal function which permits more flexibility in designing the fluidized bed. By removing thermal energy from the fuel reactant stream prior to the stream entering the scrubber, the scrubber may contain light weight, low-melting temperature contact materials which can be easily fluidized. In addition, in sizing the water-control loop pump, a lower flow can be used because it is set only by contaminant removal requirements, not thermal control requirements. Also, the fluidized bed scrubber enhances contact between the fuel reactant stream and the separated contaminant water stream compared to less efficient scrubbers such as packed beds, etc. This enhances absorption of the ammonia contaminant, thereby permitting use of a much smaller separator scrubber container.

To achieve such performance with de-contamination systems of the prior art, either a much larger, more costly and more complicated scrubber and/or ion exchange bed would be required or replacement of an ion exchange bed or other contaminant isolation apparatus would be required at much more frequent intervals. The present disclosure isolates the contaminants within an ion exchange bed that is separated from all other power plant water systems, such as a fuel reformer system, so that only ammonia has to be removed from the water. Therefore, the contaminant removal system of the present disclosure achieves extremely efficient removal of contaminants within the fuel cell fuel reactant stream and also achieves maintenance of optimal temperature and moisture content of the fuel reactant stream.

The present disclosure provides a fluidized bed contaminant separator and water-control loop for a fuel reactant stream of a fuel cell that overcomes deficiencies of the prior art. The present disclosure also provides a fluidized bed contaminant separator and water-control loop for a fuel reactant stream of a fuel cell that enhances removal of contaminants from, and maintenance of an optimal temperature and moisture content of, a fuel reactant stream of a fuel cell.

These and other purposes and advantages of the present fluidized bed contaminant separator and water-control loop for a fuel reactant stream of a fuel cell will become more readily apparent when the following description is read in conjunction with the accompanying drawings.

DESCRIPTION OF THE PREFERRED EMBODIMENTS

Figure 1:
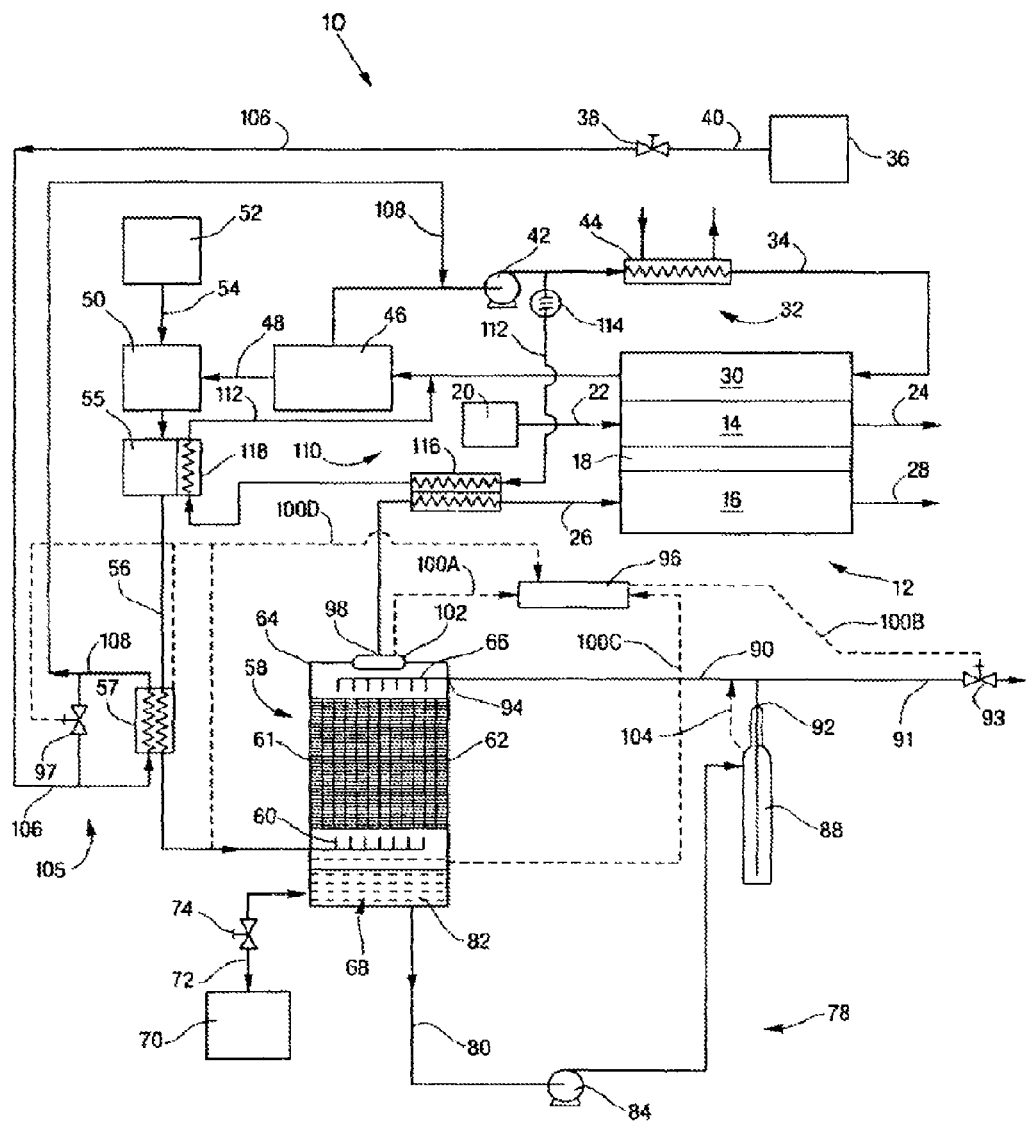
FIG. 1 is a simplified schematic representation of a fluidized bed contaminant separator and water-control loop of the present disclosure.

Referring to the drawings in detail, a fluidized bed contaminant separator and water-control loop for a fuel reactant stream of a fuel cell is shown in FIG. 1 and is generally designated by the reference numeral 10. A fuel cell 12 appropriate for the present disclosure includes a cathode flow field 14 and an anode flow field 16 secured to apposed sides of an electrolyte 18. The electrolyte 18 may be a phosphoric acid electrolyte, a proton exchange membrane ("PEM") electrolyte, or any electrolyte known in the art. An oxygen supply 20 delivers an oxygen containing reactant stream through an oxidant inlet 22 into and through the cathode flow field 14, and the oxygen reactant stream leaves the fuel cell 12 through a cathode vent 24. A hydrogen containing reducing fluid fuel is directed to flow through a fuel reactant inlet line 26 through the anode flow field 16 and out of the fuel cell 12 through anode vent 28.

The fuel cell 12 may also include a coolant plate 30 that has a water-based coolant circulating through the plate 30 by way of a coolant loop 32. The coolant loop 32 may include a coolant loop conduit 34 that directs the coolant through the coolant loop 32. A coolant supply 36 selectively directs the coolant through a coolant inlet valve 38 and coolant inlet line 40 into the coolant loop conduit 34. A coolant pump 42 is secured in fluid communication with the coolant loop conduit 34 for pumping the coolant through the coolant loop 32. A coolant loop heat exchanger 44 is secured in heat exchange relationship with the coolant loop conduit 34 to control a temperature of the coolant cycling through the coolant loop conduit 34. A steam separator 46 is secured in fluid communication with the coolant loop conduit 34 for separating steam from liquid coolant within the coolant loop conduit 34.

Steam is directed from the steam separator 46 through a steam line 48 into a reformer means 50 for reforming a hydrogen rich fuel, such as natural gas, into a reformate fuel containing hydrogen gas. A hydrogen containing fuel supply 52 directs the fuel through a fuel line 54 into the reformer 50. The fuel supply 52 may be a pressurized supply source, or may include pressurizing means for increasing a pressure of the fuel in a manner known in the art. The reformer 50 may be any reformer means known in the art for reforming hydrogen rich fluids into reformate fuels appropriate for use in fuel cells. The reformer 50 may be part of a fuel processing system (not shown) that also includes related components necessary for processing the hydrogen rich fuel into a reformate fuel appropriate for a fuel cell, such as de-sulfurizers, shift converters, burners, etc.

The reformate fuel leaves the reformer 50 and related components and the fuel may then also pass through a low temperature shift converter 55 and then through a first section 56 of the fuel reactant inlet line 26. Next, the fuel is directed through a fuel-control heat exchanger 57 secured in heat exchange relationship with the fuel reactant inlet line and then into a contaminant separator scrubber 58 to be discharged through a fuel reactant discharge 60 within the scrubber 58. The separator scrubber 58 includes an ammonia dissolving media 61 for dissolving ammonia from the reformate fuel into a liquid separated contaminant stream within the separator scrubber 58, such as a fluidized bed 62 consisting of a light weight high surface area medium disposed within a scrubber container 64. Alternative ammonia dissolving media 61 that may be utilized include smooth or dimpled balls made of polypropylene or other plastic or light weight metal such as aluminum or thin walled stainless steel. Other fluidizable shapes made of these same materials may also be employed.

A water discharge 66 is secured above the fluidized bed 62 for discharging water from the discharge 66 to pass downward by gravity through the fluidized bed 62. The fuel discharge 60 is secured below the fluidized bed 62 so that the fuel discharged through the discharge 60 passes upward through the fluidized bed 62 as the water is flowing downward through the fluidized bed 62. As the gaseous fuel passes over and contacts the surface area of the fluidized bed 62, contaminants within the gaseous fuel are dissolved into solution within the water passing over the surface of the medium within the fluidized bed 62. An accumulator 68 is defined within the scrubber container 64 such as below the fuel reactant discharge 60 so that water passing downward through the fluidized bed 62 is accumulated within the accumulator 68.

A supply of fresh water 70 may be secured in fluid communication with the scrubber container 64 to direct water through a water inlet line 72 and water inlet valve 74 into the scrubber container 64 upon start up or to supplement the scrubber 58 with additional water during operation if a water balance is not maintained.

A water-control loop 78 is secured in fluid communication with the separator scrubber 58 by way of a loop conduit 80. The loop conduit 80 is secured to a water outlet 82 defined within the scrubber container 64 and in fluid communication with the water within the accumulator 68. The water-control loop 78 also includes a water-control pump means 84 for pumping a stream of water out of the separator scrubber 58 and through the loop 78. The water-control loop 78 also includes an ion exchange bed 88 secured in fluid communication with the loop conduit 80 for directing flow of the separated contaminant stream through the ion exchange bed 88 and for removing separated contaminants from the water in the contaminant stream within the bed 88. The water-control loop 78 also includes a loop conduit return line 90 secured in fluid communication between an outlet 92 of the ion exchange bed 88 and a water inlet 94 of the separator scrubber 58 for returning decontaminated water from the water-control loop 78 back into the separator scrubber 58 through the water discharge 66. The water-control loop 78 also includes a water discharge line 91 and water discharge valve 93 secured in fluid communication with the loop conduit 80 and the outlet 92 of the ion exchange bed 88, for directing excess water out of the water-control loop 78. The water-control loop 78 may also include a gas vent by-pass line 104 secured in fluid communication between the ion exchange bed 88 to provide an escape conduit for any accumulated gasses from the bed 88 back into the loop conduit return line 90. Such accumulated gases within the ion exchange bed 88 may disrupt efficient operation of the ion exchange bed 88.

The ion exchange bed 88 may be any ion exchange means known in the art for removing contaminants from liquid streams, such as a bed including a cation exchange resin, and more specifically a hydrogen form cation exchange bed would be preferred for removal of ammonia.

The separator scrubber 58 and water-control loop 78 may also include a controller means 96 for sensing information such as a temperature and/or a moisture content of the fuel reactant stream entering or leaving the scrubber 58. The controller means 96 may be designed for sensing such temperature, water level, and/or moisture information and communicating that information by way of communication lines, such as electric wires, radio transmissions, optical fibers or any signal communication means capable of achieving those functions, such as microprocessors, computers and the like. The sensed information may be utilized by the controller 96 to control a fuel-control heat exchanger control valve 97 and/or the water discharge valve 93. Control lines for transfer of sensed information and control information to and from the controller 96 are represented in FIG. 1 by hatched lines 100A, 100B, 100C and 100D. Such controller means 96 may include computers as well as electromechanical switches and/or manual control of the water discharge valve 93 and/or fuel-control heat exchanger control valve 97 in response to sensed temperature, water level, and/or moisture information at the scrubber fuel outlet 98. It is known that the solubility of ammonia in water increases with decreasing water temperatures. Therefore, the controller means 96 may be used to adjust the temperature of the fuel stream entering the scrubber 58 and thereby the water-control loop 78, as well as the water being discharged through the water discharge 66, to thereby adjust the amount of ammonia dissolved into the water. This effectively increases or decreases the decontamination of the fuel reactant stream.

The scrubber 58 may also include a mist eliminator 102 adjacent the scrubber fuel outlet 98 for eliminating movement of any water droplets along with the fuel reactant stream. The mist eliminator 102 may be any mist eliminator for achieving such a function, such as steel-wool, etc. As shown in FIG. 1, the separator scrubber 58 is configured so that the scrubber fuel outlet 98 is positioned above the ammonia dissolving media 61 and the fuel discharge 60 is positioned below the ammonia dissolving media 61. Therefore, the scrubber fuel outlet 98 directs flow of the fuel reactant stream out of the separator scrubber 58 after it has passed through the ammonia dissolving media 61.

The fluidized bed 62 may contain any light weight high surface area medium capable of being fluidized for use in scrubbers for removing contaminants by way of flow of liquid over the surface area of the medium. Examples of such high surface area media that may be used in the fluidized bed include hollow spheres, hollow ellipsoidal elements, or hollow shapes with indentations to collect water and increase tumble velocity, etc. which can be made from any light weight material such as plastic.

The separator scrubber 58 and water-control loop 78 are shown in FIG. 1 as down-stream, between the reformer means and the anode flow field 16 secured to the fuel reactant inlet line 26. It is pointed out however, that the separator scrubber 58 and water-control loop 78 may also be positioned anywhere between a component of the reformer means that generates ammonia or any contaminant and the anode flow field 16 so that some components, such as the low temperature shift converter 55, may be secured between the scrubber 58 and the anode flow field 16, depending upon a variety of specific factors for a particular fuel cell 12.

In order to enhance thermal efficiency of the fluidized bed contaminant separator and water-control loop 10, the water-based coolant circulating through the coolant loop 32 may be directed to flow from a cool portion of the coolant loop 32, such as downstream from the coolant heat exchanger 44 and upstream from the fuel cell 12, for example at the coolant inlet line 40, through a fuel-control heat exchanger coolant loop 105 that includes a feed line 106 to the fuel-control heat exchanger 57, as shown in FIG. 1. This relatively cool water-based coolant then removes thermal energy from the fuel passing through the heat exchanger 57. The fuel-control heat exchanger coolant loop 105 then directs the heated water-based coolant through a fuel-control heat exchanger return line 108 back to the coolant loop 32. Optionally, the fuel control heat exchanger control valve 97 may direct all or some of the water-based coolant to by-pass the fuel control heat exchanger 57 by directing the coolant from the feed line 106 into the return line 108. Preferably, the return line 108 directs the heated coolant into the coolant loop 32 at portion of the coolant loop 32 wherein the acquired heat is not detrimental to operation of the fuel cell 12, such as upstream of the coolant loop pump 42 and downstream from the fuel cell 12. The coolant inlet valve 38 may be secured to the fuel-control heat exchanger feed line 106 (as shown in FIG. 1) to control flow of the coolant to the fuel-control heat exchanger 57. The coolant inlet valve 38 may also be secured in communication with the controller means 96 to control operation of the valve 38 and fuel-control heat exchanger loop 105. By capturing the excess thermal energy in the fuel-control heat exchanger 57 and directing it to the coolant loop 32 having an operating coolant heat exchanger 44, the fuel-control heat exchanger loop 105 substantially enhances thermal efficiency of the fluidized bed contaminant separator and water-control loop 10.

The fluidized bed contaminant separator and water-control loop 10 may also include a scrubber outlet gas re-heater loop 110 shown in FIG. 1. The scrubber outlet gas re-heater loop 110 directs flow of a portion of the water-based coolant from the coolant loop 32 downstream from the coolant pump 42 and upstream from the coolant loop heat exchanger 44 through a gas re-heater loop conduit 112. A fixed flow orifice 114 may be secured to the gas reheated loop conduit 112 to control a rate of flow of the coolant through the gas re-heater loop conduit 112. The conduit 112 directs the coolant into a scrubber outlet gas heat exchanger 116 which is a component of the outlet gas re-heater loop 110. Because the coolant is directed into the gas re-heater loop conduit 112 upstream from the coolant loop heat exchanger 44, the coolant is very hot. Within the scrubber outlet gas heat exchanger 116 the coolant passes in heat exchange relationship with the fuel passing within the fuel inlet line 26 between the separator scrubber 58 and the anode fuel cell 12, thereby heating the fuel. When the decontaminated fuel passes through the scrubber fuel outlet 98 out of the scrubber separator 58 it is saturated with water. By heating the fuel prior to the fuel passing into the fuel cell 12 and the anode flow field 16, the scrubber gas re-heater loop 110 substantially raises the temperature of the fuel to minimize condensation of the water out of the fuel within the anode flow field 16, to thereby avoid liquid water interrupting flow of the fuel through the fuel cell 12 and/or to otherwise eliminate damage to the fuel cell by condensed water in the fuel.

The scrubber outlet gas re-heater loop 110 then directs flow of the slightly cooled coolant from the scrubber outlet gas heat exchanger 116 through the gas re-heater loop conduit 112 into a shift converter heat exchanger 118, which may be another component of the outlet gas re-heater loop 110. The shift converter heat exchanger 118 is secured in heat exchange relationship with the fuel passing through the low temperature shift converter 55 to cool the shift converter 55. The scrubber outlet gas re-heater loop 110 then directs flow of the coolant, which may then be a mixture of steam and water, from the shift converter heat exchanger 118 through the gas re-heater loop conduit 112 back into the coolant loop 32 at a location in the coolant loop 32 that may be upstream from the coolant pump 42 and may also be upstream from the steam separator 46.

It can be seen that the scrubber gas re-heater loop 110 provides for pre-cooling the coolant in the outlet gas re-heater heat exchanger 116 to thereby improve the cooling function of the coolant for the low temperature shift converter 55, while also protecting the fuel cell 12 and the anode flow field 16 from water condensation. The scrubber gas re-heater loop 110 eliminates any need for an electric heater (not shown) to re-heat the fuel which would increase parasitic power and thereby reduce the efficiency of the fuel cell power plant 10. Similarly, the scrubber gas re-heater loop 110 is much more compact and less costly than using a regenerative heat exchanger (not shown) to re-heat the fuel.

Figure 2:
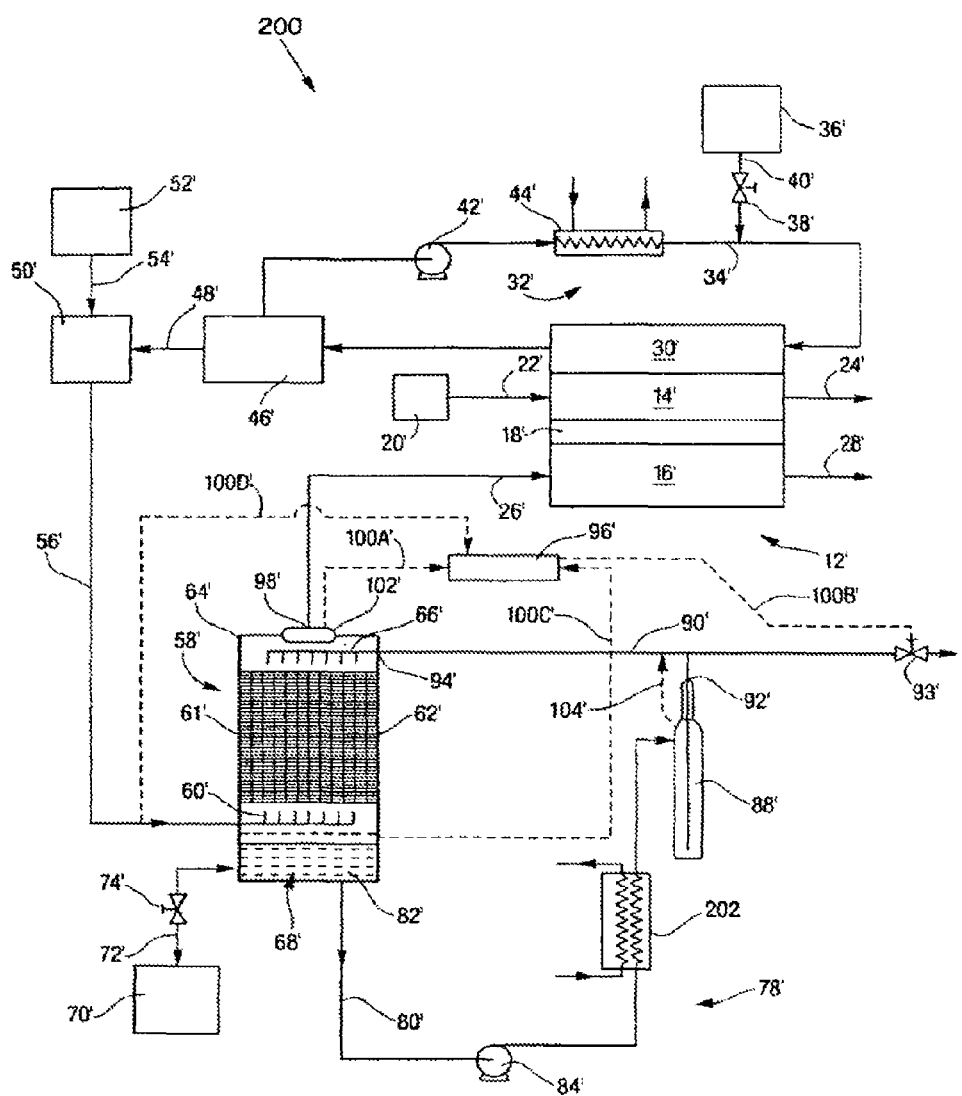
FIG. 2 is a simplified schematic representation of an alternative embodiment of a fluidized bed contaminant separator and water-control loop of the present disclosure.

FIG. 2 shows an alternative embodiment 200 of the present disclosure. (In FIG. 2, components that are virtually identical to the components shown in FIG. 1 are associated with primes of the same reference numerals as those utilized in FIG. 1. For example, the fuel cell 12 of FIG. 1 is shown in FIG. 2 as a fuel cell with reference numeral 12'.) In the FIG. 2 embodiment 200, the fuel-control heat exchanger 57 of the FIG. 1 embodiment is eliminated. Instead, a water-control heat exchanger 202 is secured in heat exchange relationship with the loop conduit 80' and is secured to the loop conduit 80' upstream from the ion exchange bed 88'. The heat exchanger 202 may be used for heating or cooling the water stream within the loop conduit 80'. The water-control heat exchanger 202 may be configured and/or operated to transfer thermal energy with the water stream to thereby maintain an optimal temperature of the water passing through the water-control loop 78' to thereby produce a desired temperature and dew point of the reactant fuel stream passing through and leaving the separator scrubber 58'. The water-control loop 78' also includes a loop conduit return line 90' secured in fluid communication between an outlet 92' of the ion bed 88' and a water inlet 94' of the separator scrubber 58' for returning the water stream from the water-control loop 78' back into the separator scrubber 58' through the water discharge 66'.

The FIG. 2 embodiment 200 includes the fluidized bed 62' of the FIG. 1 embodiment 10. However, the FIG. 2 embodiment anticipates that reformate fuel stream within the first section 56' of the hydrogen inlet line 26' may or may not need cooling. For example, cooling may be achieved by other methods such as evaporation of water in the separator scrubber 58 and/or apparatus. Additionally, the fluidized bed 62' contact materials may be high-temperature, light weight materials capable of being fluidized while being subject to a very high temperature reformate fuel reactant stream, so that no heat removal method and/or apparatus is required upstream of the separator scrubber 58'.

By first separating the ammonia or other contaminants, within the separator scrubber 58, 58' from the fuel reactant stream within the inlet line 26, 26', the FIG. 1 first embodiment 10 and the FIG. 2 alternative embodiment 200, both achieve substantial efficiencies over known art. As recited above, maintenance intervals for replacement of ion exchange material with the ion exchange bed 88, 88', or service thereof to remove contaminants within the ion exchange bed 88, 88', may be extended for substantial durations to minimize maintenance costs. In particular, where the ammonia contamination level of a fuel source is known, the ion exchange bed 88, 88' may be selected to have a contaminant removal capacity such that the ion exchange bed 88, 88' may only have to be serviced at a predetermined interval, such as once per year.

Additionally, because the contaminant removal process of the present disclosure is essentially a two-step process including first separating out the contaminants from the fuel reactant stream within the scrubber 58, 58' and then isolating and concentrating them within the ion exchange bed 88, 88', interruption in the flow of the fuel through the fluidized bed 62, 62' provides only a very modest pressure drop. Because there is such a modest pressure drop, the costs and complexities of delivering the fuel from the fuel supply 52, 52' through the fuel cell 12, 12' are minimized.

With respect to the FIG. 1 embodiment 10, the contaminant separator 58 and water-control loop 78 of the present disclosure also include a method of decontaminating a fuel reactant stream for the fuel cell 12. The method includes the steps of flowing the fuel reactant stream adjacent surfaces of ammonia dissolving media 61 within a fluidized bed 62 within a separator scrubber 58 while simultaneously flowing water over the surfaces of the ammonia dissolving media 61 within the fluidized bed 62 to separate contaminants from the fuel reactant stream into the water; then accumulating the contaminated water that has flowed over the ammonia dissolving media 61 within the fluidized bed 62 within an accumulator 68; circulating the contaminated water through a water-control loop 78 from a water outlet 82 of the scrubber into a water discharge 66 within the scrubber 58 to flow over the surface areas of the fluidized bed 62; while circulating the contaminating water through the water-control loop 78, decontaminating the contaminated water within an ion exchange bed 88 secured in fluid communication with the water-control loop; and, controlling a temperature of the fuel reactant stream flowing through a first section 56 of a fuel reactant stream inlet line 26 secured in fluid communication with the separator scrubber 58 to produce an optimal temperature of the fuel reactant stream passing through the separator scrubber 58. An additional and optional step may include adding an ammonia solubility enhancing reagent to the separated contaminated water stream before the step of removing contaminants from the separated contaminated water stream within the ion exchange bed 88 step. Any reagents that enhance ammonia solubility and that are compatible with the described fluidized bed contaminant separator and water-control loop 78 would be appropriate, such as an appropriate concentration of phosphoric acid or carbonic acid. The carbon dioxide in the reformate fuel stream dissolves in water passing through the separator scrubber 58 thereby forming carbonic acid, which enhances ammonia solubility in the water. By utilizing a cation-only exchange resin to selectively remove the ammonia cations, the dissolved carbon dioxide and carbonic acid anions are allowed to remain in the water and improve the ammonia removal performance of the separator scrubber 58.

In an alternative embodiment, the contaminant separator scrubber 58 and water-control loop 78 of the present disclosure may be utilized to remove contaminants from the fuel flowing out of the reformer means 50 for reforming a hydrogen containing fuel into the fuel reactant stream, wherein the fuel reactant inlet line 26 directs the fuel to an alternative hydrogen consuming apparatus (not shown), such as an engine, furnace, etc. In such an embodiment, the disclosure 10 includes the fuel reformer means 50, the ammonia dissolving media 61, the water-control loop 78 and components associated therewith and described above, and wherein the fuel reactant inlet line 26 is configured to direct the fuel out of the contaminant separator 58 and into an alternative fuel consuming apparatus (not shown).

It can be seen that the fluidized bed contaminant separator and water-control loop 10 for a fuel reactant stream of a fuel cell 12 substantially enhances the efficiencies over known apparatus and methods for removing contaminants from a fuel reactant stream. As recited above, by first separating the contaminants from the reactant stream into the separated contaminated water stream and then isolating and concentrating the contaminants within the ion exchange bed 88, the present disclosure dramatically minimizes the complexities of decontaminating a fuel cell reactant stream. Instead of decontaminating the reactant stream through one large, complex apparatus that must be serviced frequently, the present disclosure permits relatively free flow of the reactant fuel through the scrubber and then concentrates and isolates contaminants. By cycling a water stream through the water-control loop 78 to be decontaminated within the ion exchange bed 88 and to then pass repeatedly over the fluidized bed 62, the present disclosure provides an efficient concentration of the isolated contaminants within the ion exchange bed 88 for periodic removal from the bed 88 at predetermined intervals to thereby minimize overall costs and maintenance requirements.

While the present disclosure has been disclosed with respect to the described and illustrated fluidized bed contaminant separators and water-control loops 10 and 200 it is to be understood that the disclosure is not to be limited to those alternatives and described embodiments. For example, while an electrolyte 18 having phosphoric acid is known to be detrimentally affected by ammonia contamination and is therefore a likely form of fuel cell 12 to benefit from this disclosure, the disclosure also will be of substantial advantage to and appropriate for fuel cells with other known electrolytes, as well as to other energy consuming apparatus. Accordingly, reference should be made primarily to the following claims rather than the forgoing description to determine the scope of the disclosure.

Although example embodiments have been disclosed, a worker of ordinary skill in this art would recognize that certain modifications would come within the scope of the claims. For that reason, the following claims should be studied to determine their true scope and content.

What is claimed is:

1. A method of decontaminating a fuel reactant stream for a fuel cell, comprising:
flowing the fuel reactant stream through a fluidized ammonia dissolving media within a fluidized bed that dissolves ammonia and removes particulates from the fuel reactant stream within a separator scrubber, while simultaneously flowing water through the fluidized ammonia dissolving media within the fluidized bed to separate contaminants from the fuel reactant stream into a separated contaminant and water stream;
accumulating the separated contaminant and water stream from the fluidized bed within an accumulator;
circulating the separated contaminant and water stream from the accumulator through a water-control loop;
decontaminating the separated contaminant and water stream by flowing the stream through an ion exchange bed secured in fluid communication with the water-control loop;
circulating a decontaminated water stream from the ion exchange bed back through the ammonia dissolving media; and
controlling a temperature of the fuel reactant stream upstream of the fuel reactant stream entering the separator scrubber to produce a predetermined temperature of the fuel reactant stream passing through the separator scrubber.

2. The method of claim 1, comprising adding an ammonia solubility enhancing reagent to the ammonia dissolving media within the separator scrubber.

3. The method of claim 1, comprising replacing the ion exchange bed exchange material at predetermined time intervals.

4. The method of claim 1, comprising selecting a volume of the ion exchange bed ion exchange material so that the volume of ion exchange material within the bed may be replaced at predetermined time intervals.

5. The method of claim 1, wherein said controlling the temperature of the fuel reactant stream upstream of the fuel reactant stream entering the separator scrubber comprises controlling the temperature of the fuel reactant stream upstream of booth the separator scrubber and the water-control loop.

6. The method of claim 1, comprising sensing information from the fuel reactant stream, wherein said controlling a temperature of the fuel reactant stream upstream of the fuel reactant stream entering the separator scrubber is performed based on the sensed information.

7. The method of claim 6, wherein the sensed information includes at least one of a temperature of the fuel reactant stream, a moisture content of the fuel reactant stream, and a water level of the fuel reactant stream.

8. The method of claim 1:
wherein said controlling a temperature of the fuel reactant stream upstream of the fuel reactant stream entering the separator scrubber comprises cooling the fuel reactant stream with a first heat exchanger upstream of the separator scrubber; and
wherein the method comprises heating the fuel reactant stream with a different, second heat exchanger downstream of the separator scrubber.

9. The method of claim 8, comprising:
pumping coolant through a coolant loop conduit from a coolant plate secured adjacent to the fuel cell, through a coolant heat exchanger configured to remove heat from the coolant, and back to the coolant plate;
wherein said heating the fuel reactant stream with a different, second heat exchanger downstream of the separator scrubber comprises directing a flow of coolant from the coolant loop conduit to be in heat exchange relationship with the fuel reactant stream downstream of the separator scrubber.

10. The method of claim 1, comprising selectively discharging excess water out of the water-control loop through a water discharge valve that is in fluid communication with the water-control loop.

11. The method of claim 1, wherein the ion exchange bed includes a cation-only exchange resin.

12. A method of decontaminating a fuel reactant stream for a fuel cell, the method comprising:
directing the fuel reactant stream into a fluidized ammonia dissolving media within a fluidized bed;
removing contaminants from the fuel reactant stream within a separator scrubber;
directing water through the fluidized ammonia dissolving media to separate contaminants from the fuel reactant stream into a separated contaminant and water stream;
decontaminating the separated contaminant and water stream using an ion exchange bed;
circulating a decontaminated water stream from the ion exchange bed back through the ammonia dissolving media; and
controlling a temperature of the fuel reactant stream upstream of the fuel reactant stream entering the separator scrubber to produce a predetermined temperature of the fuel reactant stream entering the separator scrubber.

* * * * *

UNITED STATES PATENT AND TRADEMARK OFFICE
CERTIFICATE OF CORRECTION

PATENT NO. : 9,923,221 B2
APPLICATION NO. : 15/378642
DATED : March 20, 2018
INVENTOR(S) : Joshua D. Isom et al.

Page 1 of 1

It is certified that error appears in the above-identified patent and that said Letters Patent is hereby corrected as shown below:

In the Claims

In Claim 5, Column 11, Line 45; replace "booth" with --both--

Signed and Sealed this
Twenty-ninth Day of October, 2019

Andrei Iancu
*Director of the United States Patent and Trademark Office*